US010671980B2

(12) United States Patent
Lacoss-Arnold

(10) Patent No.: US 10,671,980 B2
(45) Date of Patent: Jun. 2, 2020

(54) SYSTEMS AND METHODS FOR DETECTING POTENTIALLY COMPROMISED PAYMENT CARDS

(71) Applicant: MasterCard International Incorporated, Purchase, NY (US)

(72) Inventor: Jason Jay Lacoss-Arnold, St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 930 days.

(21) Appl. No.: 14/518,804

(22) Filed: Oct. 20, 2014

(65) Prior Publication Data

US 2016/0110709 A1   Apr. 21, 2016

(51) Int. Cl.
*G06Q 20/02* (2012.01)
*G06Q 20/40* (2012.01)
*G06Q 20/34* (2012.01)
*G06Q 20/38* (2012.01)
*G06Q 20/12* (2012.01)

(52) U.S. Cl.
CPC .......... *G06Q 20/02* (2013.01); *G06Q 20/12* (2013.01); *G06Q 20/34* (2013.01); *G06Q 20/3821* (2013.01); *G06Q 20/4016* (2013.01); *G06Q 2220/00* (2013.01)

(58) Field of Classification Search
CPC ..................................................... G06Q 20/02
See application file for complete search history.

(56) References Cited

U.S. PATENT DOCUMENTS 6,658,393 B1 * 12/2003 Basch ................. G06Q 20/341
705/35
7,548,889 B2 * 6/2009 Bhambri ............... G06Q 20/12
705/50
7,778,903 B2 * 8/2010 Weichert .............. G06Q 20/00
705/35

(Continued)

OTHER PUBLICATIONS

Carolina, Anita, "Online Credit Card Fraud: An Emerging Crime in the Information Technology," Jurnal InFestasi, vol. 8, No. 2, all pages. (Year: 2012).*

*Primary Examiner* — Jacob C. Coppola
(74) *Attorney, Agent, or Firm* — Armstrong Teasdale LLP

(57) ABSTRACT

A computer-implemented method for detecting potentially compromised payment cards is provided. The method uses a processor in communication with a memory. The method includes storing a plurality of tokens. Each token includes merchant identification data corresponding to a first merchant. The method also includes transmitting the plurality of tokens to the first merchant and receiving an authorization request message from a merchant. The authorization request message includes a token and a merchant identifier corresponding to the merchant. The method further includes determining that the received token is one of the plurality of tokens associated with the first merchant, determining that the merchant identifier does not correspond to the first merchant, transmitting a message including instructions to decline the transaction, and attaching a potentially compromised flag to the first merchant. The potentially compromised flag indicates a heightened probability of fraudulent activity.

19 Claims, 7 Drawing Sheets

(56) References Cited

U.S. PATENT DOCUMENTS

| | | | |
|---|---|---|---|
| 7,827,101 B2* | 11/2010 | Mascavage, III | G06Q 20/04 705/39 |
| 8,380,177 B2* | 2/2013 | Laracey | G06Q 30/0253 455/414.1 |
| 8,386,381 B1* | 2/2013 | Barton | G06Q 40/00 705/35 |
| 8,489,894 B2* | 7/2013 | Comrie | G06F 21/6209 713/172 |
| 8,595,490 B2 | 11/2013 | Von Mueller et al. | |
| 8,788,421 B2* | 7/2014 | Ducharme | G06Q 20/3821 705/44 |
| 9,256,871 B2* | 2/2016 | Anderson | G06Q 20/12 |
| 9,430,652 B1* | 8/2016 | Mattsson | G06F 21/6245 |
| 9,600,819 B2* | 3/2017 | Wiesman | G06Q 20/4016 |
| 9,704,155 B2* | 7/2017 | McCullagh | G06Q 20/363 |
| 2001/0034720 A1* | 10/2001 | Armes | G06Q 10/04 705/65 |
| 2003/0028481 A1* | 2/2003 | Flitcroft | G06Q 20/00 705/39 |
| 2003/0187759 A1* | 10/2003 | Arthus | G06Q 20/04 705/30 |
| 2004/0139008 A1* | 7/2004 | Mascavage, III | G06Q 20/04 705/40 |
| 2005/0086169 A1* | 4/2005 | Wells | G06Q 20/04 705/44 |
| 2007/0192249 A1* | 8/2007 | Biffle | G06Q 10/02 705/44 |
| 2008/0189214 A1 | 8/2008 | Mueller et al. | |
| 2008/0319869 A1* | 12/2008 | Carlson | G06Q 20/02 705/26.1 |
| 2010/0145860 A1* | 6/2010 | Pelegero | G06Q 20/12 705/71 |
| 2010/0169192 A1* | 7/2010 | Zoldi | G06Q 40/00 705/30 |
| 2010/0223186 A1* | 9/2010 | Hogan | G06Q 20/02 705/71 |
| 2011/0161233 A1* | 6/2011 | Tieken | G06Q 20/04 705/71 |
| 2011/0307382 A1* | 12/2011 | Siegel | G06Q 20/04 705/44 |
| 2012/0041881 A1* | 2/2012 | Basu | G06Q 20/02 705/67 |
| 2012/0226613 A1* | 9/2012 | Adjaoute | G06Q 40/02 705/44 |
| 2013/0024375 A1 | 1/2013 | Choudhuri et al. | |
| 2013/0031006 A1* | 1/2013 | McCullagh | G06Q 20/363 705/66 |
| 2013/0117138 A1 | 5/2013 | Hazel et al. | |
| 2014/0279331 A1* | 9/2014 | Gimby | G06Q 40/02 705/35 |
| 2014/0372308 A1* | 12/2014 | Sheets | G06Q 20/40 705/44 |
| 2015/0127547 A1* | 5/2015 | Powell | G06Q 20/382 705/67 |

* cited by examiner

SYSTEMS AND METHODS FOR DETECTING POTENTIALLY COMPROMISED PAYMENT CARDS

BACKGROUND OF THE DISCLOSURE

The field of the disclosure relates generally to increasing security surrounding online payment card transactions, and more specifically to method and systems for determining when and where payment card numbers stored by merchants have been compromised.

Many online merchants store payment card information, including payment card numbers, for their returning customers, to process returns, and/or for purchase trend research. This payment card information may include other cardholder identifying information. In many cases, this information is stored for processing recurring transactions or to improve the speed of the checkout process for future online transactions. The stored payment card information allows a customer to avoid having to re-enter his or her payment card information every time the customer makes an online purchase from the merchant. However, this payment card information has the potential to be stolen. Over the past several years, many cases of security breaches, also known as account data compromises, have been reported. While some breaches have been for a few payment cards, other breaches have been for tens of thousands of payment cards. The stolen payment card information may then be used to perform fraudulent transactions.

Existing fraud system can learn about the compromise of individual payment cards through the analysis of good and bad transactions. When a large number of fraudulent transactions are discovered, some existing fraud systems perform statistical analysis on the fraudulent transaction to try to determine which merchant was potentially breached. However, there could be more than one breached merchant, which increases the difficulty of the analysis. Further, this analysis takes time to determine the potentially breached merchants. While this analysis is occurring more fraudulent transactions may be performed using other payment cards that were compromised at the same time, but have not yet been identified as compromised.

BRIEF DESCRIPTION OF THE DISCLOSURE

In one embodiment, a computer-implemented method for detecting potentially compromised payment cards is provided. The method uses a processor in communication with a memory. The method includes storing in the memory a plurality of tokens. Each token includes merchant identification data corresponding to a first merchant. The method also includes transmitting by the processor the plurality of tokens to the first merchant, and receiving from a merchant, an authorization request message. The authorization request message includes a token and a merchant identifier corresponding to the merchant. The method further includes determining by the processor that the received token is one of the plurality of tokens associated with the first merchant, determining by the processor that the merchant identifier does not correspond to the first merchant, transmitting by the processor a message including instructions to decline the transaction based on the determination that the merchant identifier does not correspond to the first merchant, and attaching by the processor a potentially compromised flag to the first merchant based on the determination that the merchant identifier does not correspond to the first merchant. The potentially compromised flag indicates a heightened probability of fraudulent activity.

In another embodiment, a token monitoring computing device for detecting potentially compromised payment cards is provided. The token monitoring computing device includes one or more processors communicatively coupled to one or more memory devices. The token monitoring computing device is configured to store a plurality of tokens. Each token includes merchant identification data corresponding to a first merchant. The token monitoring computing device is also configured to transmit the plurality of tokens to the first merchant, and receive an authorization request message from a merchant. The authorization request message includes a token and a merchant identifier corresponding to the merchant. The token monitoring computing device is further configured to determine that the received token is one of the plurality of tokens associated with the first merchant, determine that the merchant identifier does not correspond to the first merchant, transmit a message including instructions to decline the transaction based on the determination that the merchant identifier does not correspond to the first merchant, and attach a potentially compromised flag to the first merchant based on the determination that the merchant identifier does not correspond to the first merchant. The potentially compromised flag indicates a heightened probability of fraudulent activity.

In yet another embodiment, a computer-readable storage medium having computer-executable instructions embodied thereon is provided. When executed by a token monitoring computing device having at least one processor coupled to at least one memory device, the computer-executable instructions cause the at least one processor to store a plurality of tokens. Each token includes merchant identification data corresponding to a first merchant. The computer-executable instructions also cause the at least one processor to transmit the plurality of tokens to the first merchant, and receive an authorization request message from a merchant. The authorization request message includes a token and a merchant identifier corresponding to the merchant. The computer-executable instructions further cause the at least one processor to determine that the received token is one of the plurality of tokens associated with the first merchant, determine that the merchant identifier does not correspond to the first merchant, transmit a message including instructions to decline the transaction based on the determination that the merchant identifier does not correspond to the first merchant, and attach a potentially compromised flag to the first merchant based on the determination that the merchant identifier does not correspond to the first merchant. The potentially compromised flag indicates a heightened probability of fraudulent activity

BRIEF DESCRIPTION OF THE DRAWINGS

FIG. 1 is a schematic diagram illustrating an example multi-party transaction card industry system for enabling payment-by-card transactions in which merchants and card issuers do not need to have a one-to-one special relationship.

FIG. 2 is a simplified block diagram of an example system used for monitoring tokens in accordance with one example embodiment of the present disclosure.

FIG. 3 illustrates an example configuration of a client system shown in FIG. 2, in accordance with one embodiment of the present disclosure.

FIG. 4 illustrates an example configuration of the server system shown in FIG. 2, in accordance with one embodiment of the present disclosure.

FIG. 5 is a flowchart illustrating an example of the process 500 of replacing a payment card account number with a token to be stored by a merchant using the system shown in FIG. 2, in accordance with one embodiment of the disclosure.

FIG. 6 is a flowchart showing the process how the system shown in FIG. 2 is integrated into the payment card system payment network shown in FIG. 1.

FIG. 7 is a diagram of components of one or more example computing devices that may be used in the system shown in FIG. 2.

DETAILED DESCRIPTION OF THE DISCLOSURE

Figure 1:
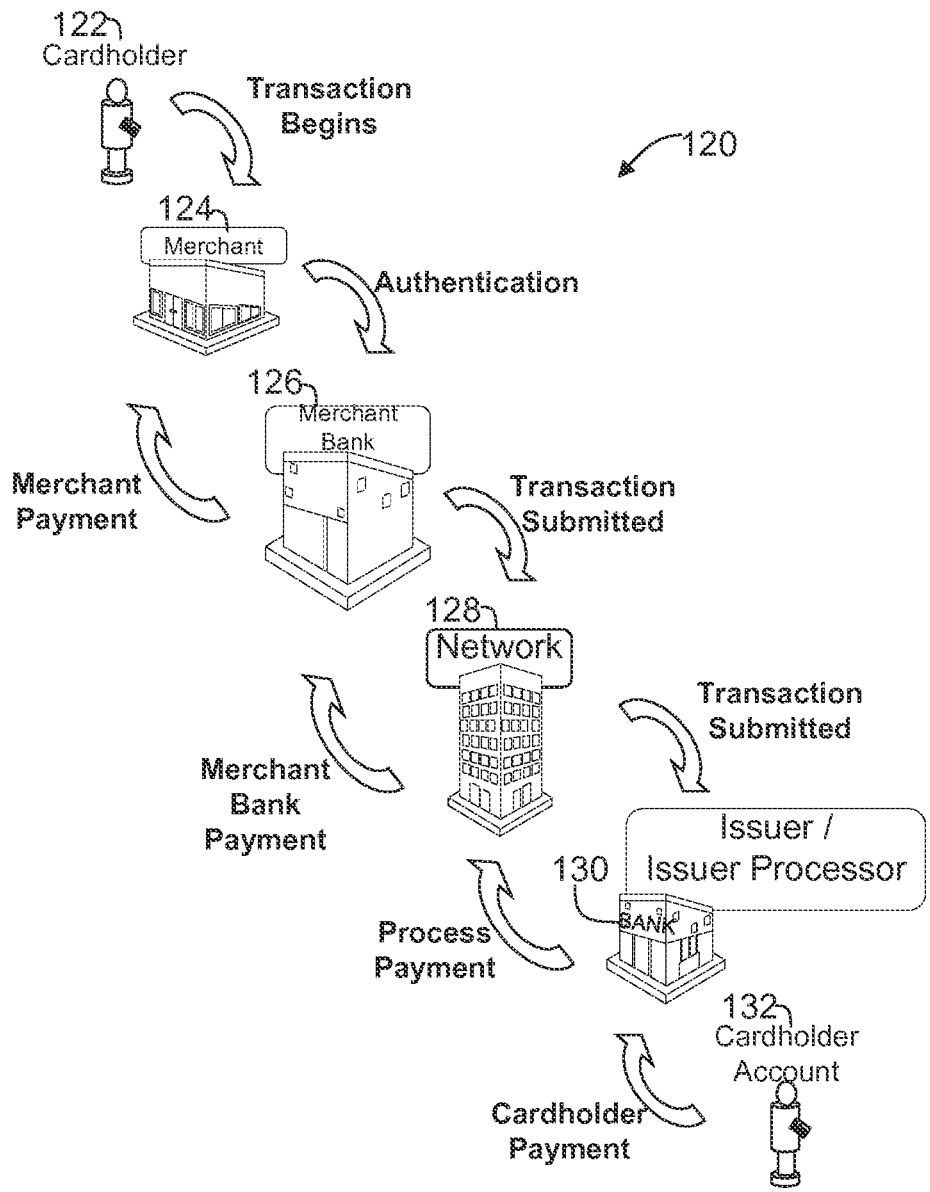
FIGS. 1-7 show example embodiments of the methods and systems described herein.

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, methods and systems for determining when and where payment card numbers stored by merchants have been compromised. Tokens, which represent cardholder account numbers and are associated with a first merchant, are stored by the first merchant for recurring transactions or future e-commerce transactions. If the first merchant is breached, for example by a hacker, and the hacker attempts to use one of the tokens as a payment card number for a transaction with a second merchant, then the breach can be quickly traced back to the original merchant.

When an online merchant receives a cardholder's payment card account number to store for future use, such as in a cardholder account on the merchant's website, the merchant transmits the account number to a token monitoring ("TM") computing device. The TM computing device generates a token that contains merchant identification data that identifies that token as being specific to that merchant. The token is formatted in the same way as the account number to appear as a payment card account number. In the example embodiment, there is a batch of tokens that are set aside to be associated with that specific merchant, and the TM computing device chooses an unused one from the batch. In other embodiments, the TM computing device randomly generates a token using one or more rules, where one or more of the rules are specific to that merchant. The TM computing device associates the generated token with the received account number. The TM computing device stores the generated token and the received account number in a database. The TM computing device transmits the generated token to the merchant, which then stores the token in the customer's account.

When a cardholder conducts a transaction with the online merchant which the cardholder has an account with, the TM computing device receives an authorization request message for the transaction. The authorization request message includes a merchant identifier and a card identifier, also known as a payment account identifier or cardholder identifier, which is formatted as an account number. The TM computing device determines whether the card identifier is a merchant-specific token based on the merchant identification data from the token. In some embodiments, the TM computing device may determine that the card identifier is a token because the identifier is within a particular series of numbers. In other embodiments, some of the characters of the card identifier identify the identifier as a token. In still further embodiments, one or more rules may be used to recognize the identifier as a token. If the card identifier is not a merchant-specific token, then the TM computing device does nothing and the transaction is processed as a normal payment card transaction.

If the card identifier is a merchant specific token, then the TM computing device determines whether the token is associated with the merchant that corresponds to the merchant identifier received in the authorization request message based on the merchant identification data from the token. If the merchant that the token is associated with is the same as the merchant from whom the transaction originated, the TM computing device retrieves the payment card account number that corresponds to the token. The TM computing device transmits the authorization request message with the retrieved payment card account number to an issuer processor.

If the merchant that the token is associated with is not the same as the merchant from whom the transaction originated, the TM computing device transmits instructions to the issuer processor to deny the transaction. The TM computing device flags the merchant that corresponds to the received token, all of the tokens associated with that merchant, and all of the payment card numbers associated with that merchant as "potentially compromised". The TM computing device initiates an investigation into the potentially compromised merchant using the received token as a starting point.

In the example embodiment, the TM computing device also notifies investigators of the potential breach and provides a mechanism for the investigators to clear the merchant once the merchant has been sanitized or it is determined that the flag was a false a positive, such as in the case of a randomly generated token being submitted by a hacker that happens to match an actual token rather than the hacker having compromised a merchant. If an investigation determines that the merchant was not compromised, then TM computing device clears the merchant and removes the flags on the tokens and card numbers. If the compromise is confirmed, then the TM computing device updates the "potentially compromised" flags to "confirmed compromised". In some embodiments, the TM computing device sends the list of confirmed compromised cards to issuer processors of the cards for card reissuance.

In some embodiments, the TM computing device reviews the date that the compromised token was issued and flags all cards that were used in a transaction since that date as "potentially compromised". In some further embodiments, cards used more recently would be given a higher risk factor. In other embodiments, cards used before the token was issued may also be flagged, but at a lower risk factor, since the nature of the compromise may or may not affect old cards. For example, a breach of a system that converts all cards into tokens wouldn't put any stored cards at risk, but would still require flagging non-stored cards used in transactions with that merchant. Whereas, a breach at a system that stores a mix of tokens and cards would put all of the stored cards at risk.

In some embodiments, after discovering a first compromised token from a merchant the TM computing device monitors for additional compromised tokens from that merchant. The existence of additional compromised tokens lowers the chance of a false positive. In other embodiments, the payment network may work with high-profile merchants to plant dummy tokens. These tokens could be used as an early indicator that the merchant had been breached.

The methods and systems described herein may be implemented using computer programming or engineering techniques including computer software, firmware, hardware, or any combination or subset. As disclosed above, at least one technical problem with prior payment card systems is that actual payment card identifiers that are stored with merchants can become compromised resulting in numerous fraudulent transactions and significant monetary losses for the parties involved in the transaction. The systems and methods described herein address that technical problem. The technical effect of the systems and processes described herein is achieved by performing at least one of the following steps: (a) storing a plurality of tokens for a first merchant, where each of the plurality of tokens is associated with a cardholder account number; (b) receiving in a transaction for a second merchant a token associated with the first merchant; (c) determining that the received token is associated with the first merchant; (d) determining that the first merchant is potentially compromised; (e) flagging all payment cards, tokens, and future transactions associated with that merchant; and (f) initiating an investigation of the first merchant for potential compromise using the received token as a starting point.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example multi-party transaction card industry system 120 for enabling payment-by-card transactions in which merchants 124 and card issuers 130 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of Master- Card International Incorporated®. (MasterCard is a registered trademark of MasterCard International Incorporated located in Purchase, N.Y.).

In a typical transaction card system, a financial institution called the "issuer" issues a transaction card or electronic payments account identifier, such as a credit card, to a consumer or cardholder 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When cardholder 122 tenders payment for a purchase with a transaction card, merchant 124 requests authorization from a merchant bank 126 for the amount of the purchase. The request may be performed over the telephone, but is usually performed through the use of a point-of-sale terminal, which reads cardholder's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 128, computers of merchant bank 126 or merchant processor will communicate with computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because bankcard associations, such as MasterCard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 and/or issuer bank 130 stores the transaction card information, such as a category of merchant, a merchant identifier, a location where the transaction was completed, amount of purchase, date and time of transaction, in a database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the exemplary embodiment, when cardholder 122 purchases travel, such as airfare, a hotel stay, and/or a rental car, at least partial itinerary information is transmitted during the clearance process as transaction data. When interchange network 128 receives the itinerary information, interchange network 128 routes the itinerary information to database 220.

For debit card transactions, when a request for a personal identification number (PIN) authorization is approved by the issuer, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant's 124 account, merchant bank 126, and issuer bank 130 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

Figure 2:
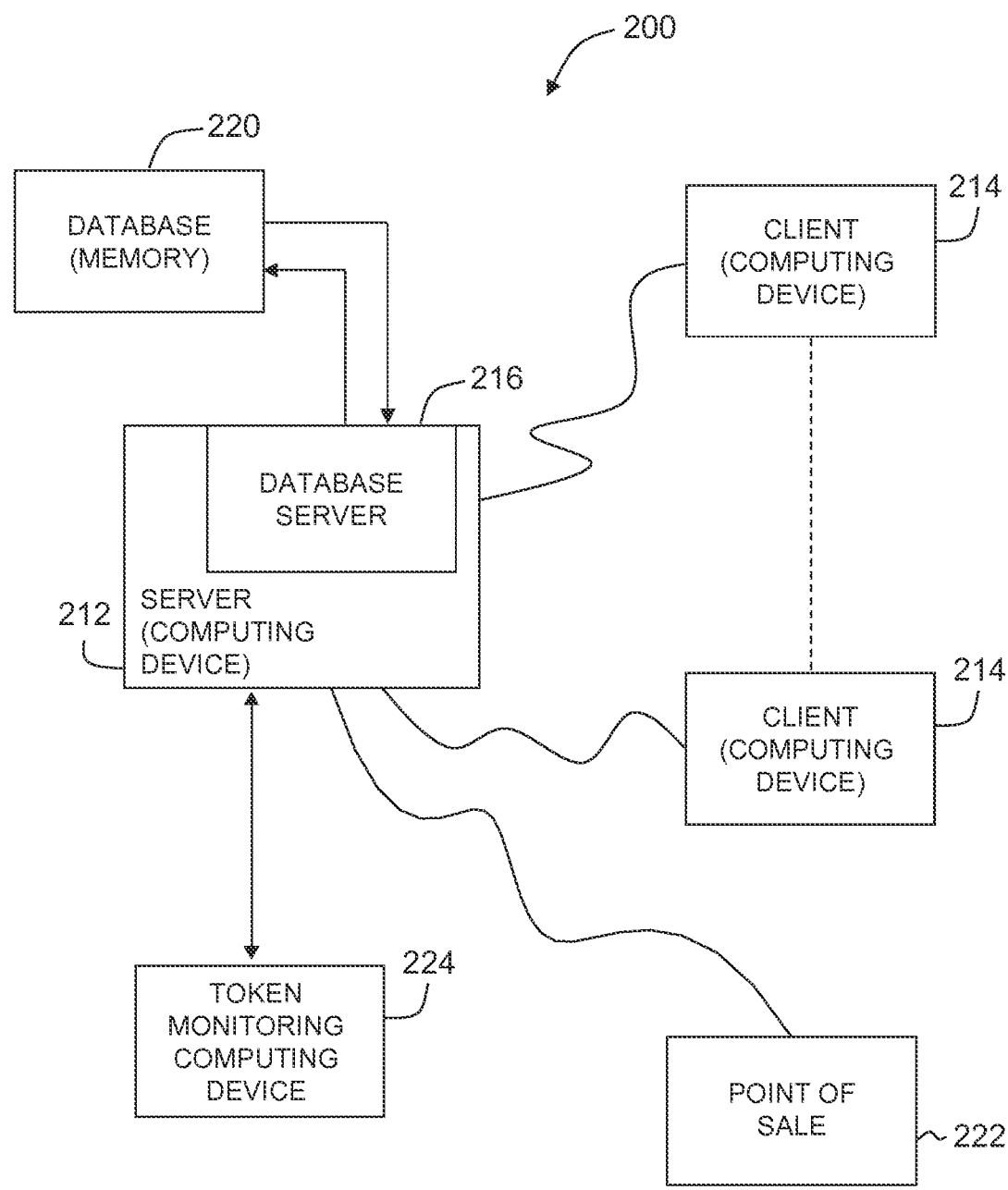

FIG. 2 is a simplified block diagram of an example system 200 used for monitoring tokens in accordance with one example embodiment of the present disclosure. In the example embodiment, system 200 may be used for performing payment-by-card transactions received as part of processing cardholder transactions. In addition, system 200 is a payment processing system that includes a token monitoring ("TM") computing device 224 configured to determine when and where payment card numbers stored by a merchant have been compromised. As described below in more detail, TM computing device 224 is configured to store a plurality of tokens for a first merchant, where each of the plurality of tokens is associated with a cardholder account number and the first merchant, receive in an authorization request from a second merchant a token associated with the first merchant, determine that the received token is associated with the first merchant, determine that the first merchant is potentially compromised and flag all payment cards, tokens, and future transactions associated with that merchant, and initiate an investigation of the first merchant for potential compromise using the received token as a starting point.

In the example embodiment, client systems 214 are computers that include a web browser or a software application, which enables client systems 214 to access server system 212 using the Internet. More specifically, client systems 214 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client systems 214 can be any device capable of accessing the Internet including, but not limited to, a desktop computer, a laptop computer, a personal digital assistant (PDA), a cellular phone, a smartphone, a tablet, a phablet, or other web-based connectable equipment.

A database server 216 is communicatively coupled to a database 220 that stores data. In one embodiment, database 220 includes transaction information from a plurality of cardholders and paths based on those transactions. In the example embodiment, database 220 is stored remotely from server system 212. In some embodiments, database 220 is decentralized. In the example embodiment, a person can access database 220 via client systems 214 by logging onto server system 212, as described herein.

TM computing device 224 is communicatively coupled with the server system 212. TM computing device 224 can access the server system 212 to store and access data and to communicate with the client systems 214 through the server system 212. In some embodiments, TM computing device 224 may be associated with, or is part of the payment system, or in communication with the payment network 120, shown in FIG. 1. In other embodiments, TM computing device 224 is associated with a third party and is in communication with the payment network 120. In some embodiments, TM computing device 224 may be associated with, or be part of merchant bank 126, interchange network 128, and issuer bank 130, all shown in FIG. 1.

One or more point of sale systems 222 are communicatively coupled with the server system 212. The one or more point of sale systems 222 can be merchants 124 shown in FIG. 1, where the point of sale systems 222 are communicatively coupled with the server system through the payment network 120. Point of sale systems 222 may be, but are not limited to, machines that accept card swipes, online payment portals, or stored payment card numbers for recurring transactions.

In some embodiments, server system 212 may be associated with a financial transaction interchange network 128 shown in FIG. 1, and may be referred to as an interchange computer system. Server system 212 may be used for processing transaction data and analyzing for fraudulent transactions. In addition, at least one of client systems 214 may include a computer system associated with an issuer of a transaction card. Accordingly, server system 212 and client systems 214 may be utilized to process transaction data relating to purchases a cardholder makes utilizing a transaction card processed by the interchange network and issued by the associated issuer. At least one client system 214 may be associated with a user or a cardholder seeking to register, access information, or process a transaction with at least one of the interchange network, the issuer, or the merchant. In addition, client systems 214 or point of sales devices 222 may include point-of-sale (POS) devices associated with a merchant and used for processing payment transactions. At least one client system 214 may be used for investigating potential breaches.

Figure 3:
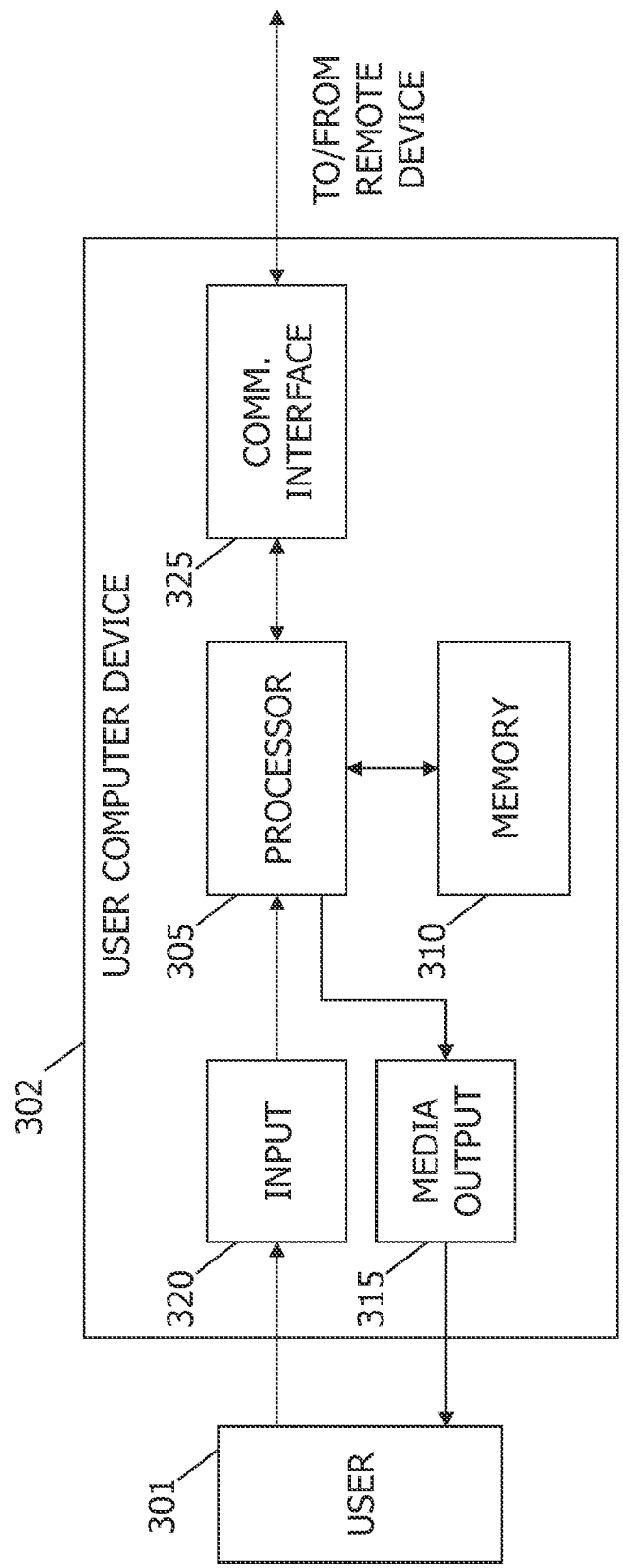

FIG. 3 illustrates an example configuration of a client system 214 shown in FIG. 2, in accordance with one embodiment of the present disclosure. User computer device 302 is operated by a user 301. User computer device 302 may include, but is not limited to, client systems 214 and TM computing device 224 (both shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as server system 212 (shown in FIG. 2). Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from server system 212. A client application allows user 301 to interact with, for example, server system 212. For example, instructions may be stored by a cloud service, and the output of the execution of the instructions sent to the media output component 315.

Figure 5:
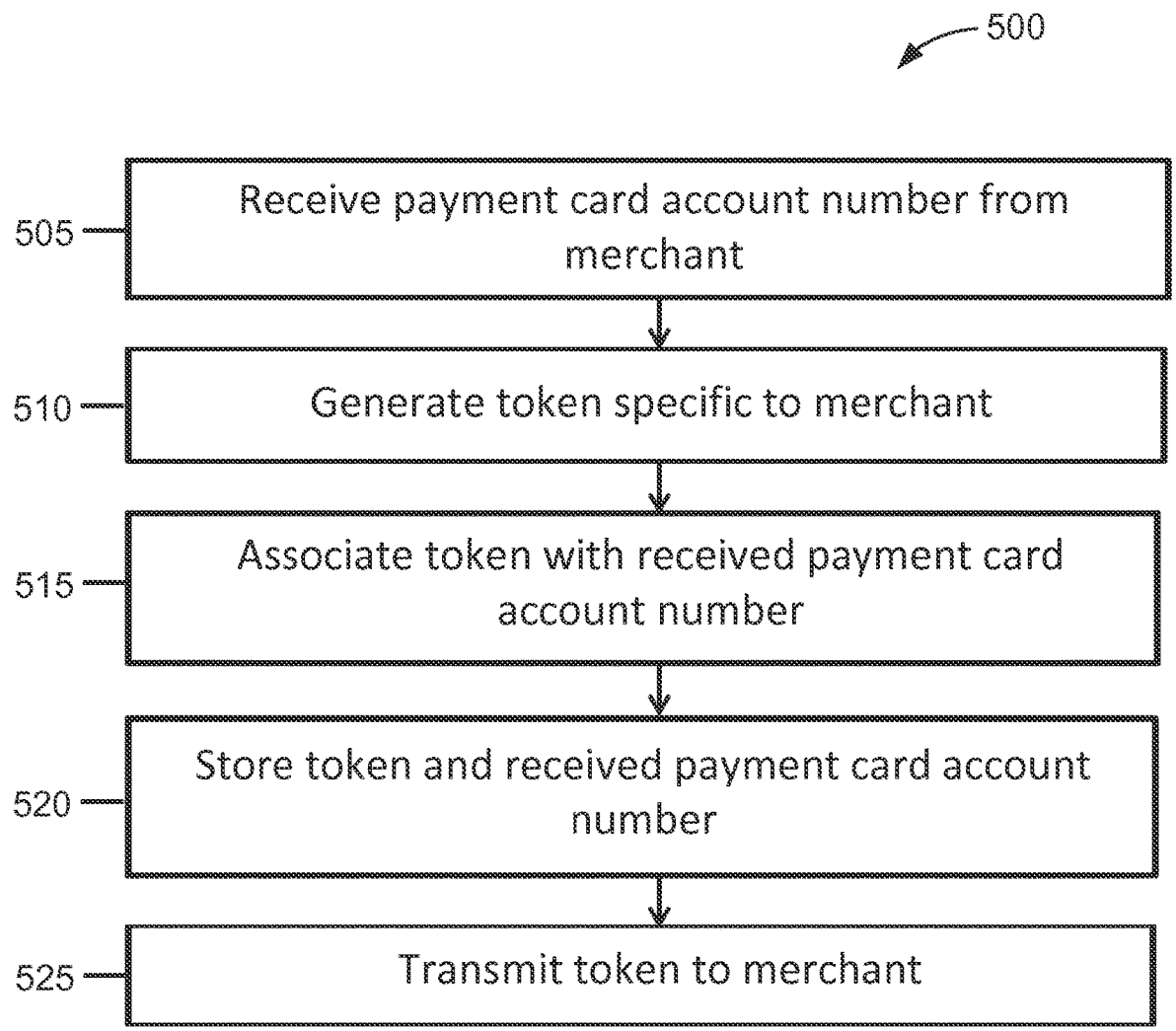
Figure 6:
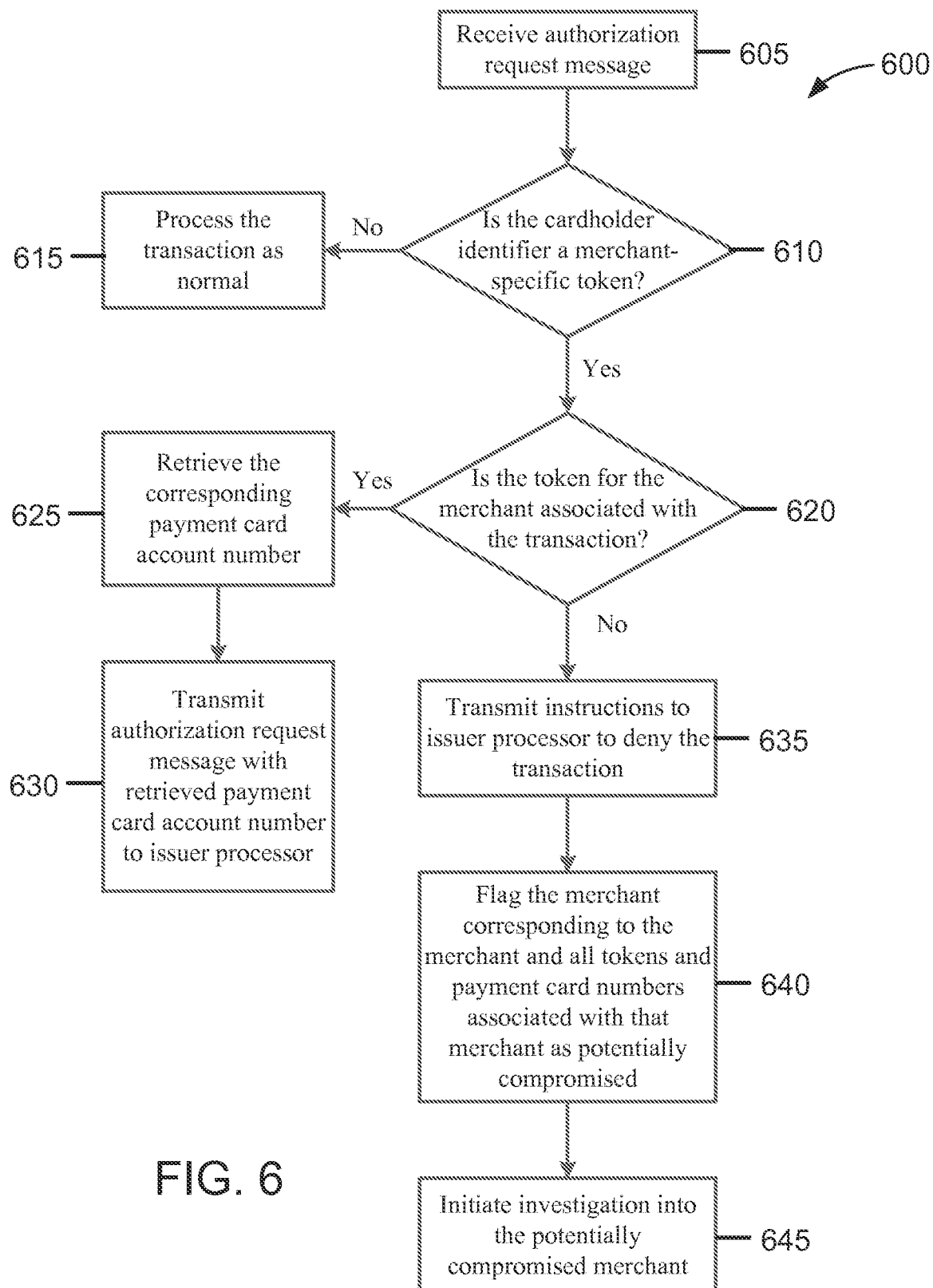

Processor 305 executes computer-executable instructions for implementing aspects of the disclosure. In some embodiments, the processor 305 is transformed into a special purpose microprocessor by executing computer-executable instructions or by otherwise being programmed. For example, the processor 305 is programmed with the instruction such as illustrated in FIGS. 5 & 6.

Figure 4:
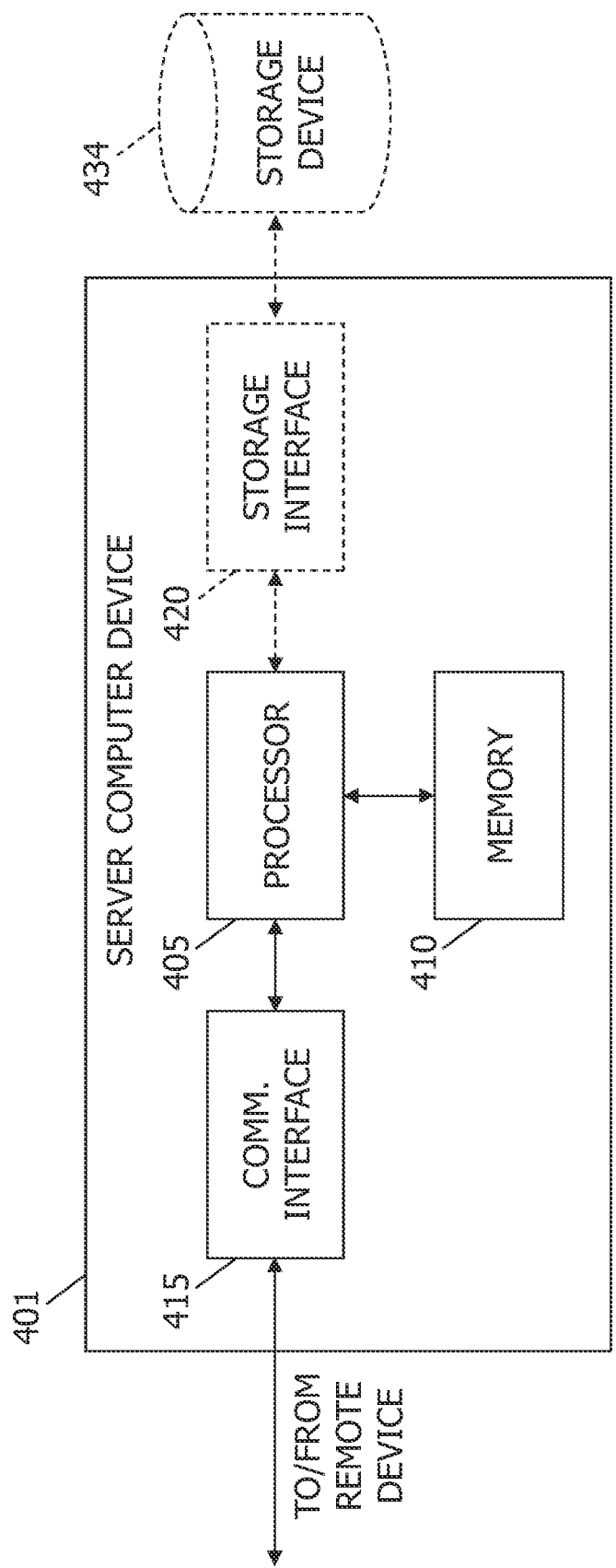

FIG. 4 illustrates an example configuration of the server system 212 shown in FIG. 2, in accordance with one embodiment of the present disclosure. Server computer device 401 may include, but is not limited to, database server 216 (shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, client systems 214, or TM computing device 224 (both shown in FIG. 2). For example, communication interface 415 may receive requests from client systems 214 via the Internet, as illustrated in FIG. 2.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

FIG. 5 is a flowchart illustrating an example of the process 500 of replacing a payment card account number with a token to be stored by a merchant using the system shown in FIG. 2, in accordance with one embodiment of the disclosure. Process 500 may be implemented by a computing device, for example TM computing device 224 (shown in FIG. 2). In the example embodiment, TM computing device 224 receives 505 a payment card account number from merchant 124 (shown in FIG. 1). The payment card account number is associated with cardholder 122, and merchant 124 is planning on storing the account number for future transactions.

TM computing device 224 generates 510 a token that contains merchant identification data that identifies that token as being specific to merchant 124. The token is formatted in the same way as the account number to appear as a payment card account number. In the example embodiment, there is a batch of tokens that are set aside to be associated with that specific merchant, and TM computing device 224 chooses an unused one from the batch. In other embodiments, TM computing device 224 randomly generates a token using one or more rules, where one or more of the rules are specific to that merchant 124. TM computing device 224 associates 515 the generated token with the received account number. TM computing device 224 stores 520 the generated token and the received account number in database 220 (shown in FIG. 2). TM computing device 224 transmits 525 the generated token to merchant 124. In the example embodiment, process 500 is performed for individual account numbers. In other embodiments, process 500 may be performed for batches of account numbers.

FIG. 6 is a flowchart showing the process 600 how the system 200 shown in FIG. 2 is integrated into the payment card system payment network 120 shown in FIG. 1. TM computing device 224 (shown in FIG. 2) receives 605 an authorization request message for a transaction initiated by cardholder 122 using a payment card at merchant 124. The authorization request message includes a merchant identifier and a card identifier that is formatted as an account number. TM computing device 224 determines 610 whether the cardholder identifier is a merchant-specific token based on the merchant identification data from the token. In some embodiments, TM computing device 224 may determine that the card identifier is a token because the identifier is within a particular series of numbers. In other embodiments, some of the characters of the card identifier identify the identifier as a token. In still further embodiments, one or more rules may be used to recognize the identifier as a token. If the card identifier is not a merchant-specific token, then TM computing device 224 does nothing and the transaction is processed 615 as normal, as shown in FIG. 1.

If the card identifier is a merchant specific token, then TM computing device 224 determines 620 whether the token is associated with merchant 124 that corresponds to the merchant identifier received in the authorization request message based on the merchant identification data from the token. If the merchant that the token is associated with is the same as the merchant from whom the transaction originated, then TM computing device 224 queries database 220 (shown in FIG. 2) and retrieves 625 the payment card account number that corresponds to the token. TM computing device 224 transmits 630 the authorization request message with the retrieved payment card account number to the issuer processor 130, shown in FIG. 1.

If the merchant that the token is associated with is not the same as the merchant from whom the transaction originated, then TM computing device 224 transmits 635 instructions to the issuer processor to deny the transaction. TM computing device 224 flags 640 the merchant corresponding to the received token, all of the tokens associated with that merchant, and all of the payment card numbers associated with that merchant as "potentially compromised". TM computing device 224 initiates 645 an investigation into the potentially compromised merchant using the received token as a starting point.

In the example embodiment, TM computing device 224 notifies investigators of the potential breach and provides a mechanism for the investigators to clear the merchant once merchant 124 has been sanitized or it is determined that the flag was a false a positive, such as in the case of a randomly generated token being submitted by a hacker that happens to match a token rather than the hacker having compromised merchant 124. If an investigation determines that merchant 124 was not compromised, then TM computing device 224 clears merchant 124 and removes the flags on the tokens and card numbers. If the compromise is confirmed, then TM computing device 224 updates the "potentially compromised" flags to "confirmed compromised". In some embodiments, TM computing device 224 sends the list of confirmed compromised cards to issuer processors of the cards for card reissuance.

In some embodiments, TM computing device 224 could examine the date that the compromised token was issued and flag all cards that were used since that date as "potentially compromised". In some further embodiments, cards used more recently would be given a higher risk factor. In other embodiments, cards used before the token was issued may also be flagged, but at a lower risk factor, since the nature of the compromise may or may not affect old cards. For example, a breach of a system that converts all cards into tokens wouldn't put any stored cards at risk, but would still require flagging non-stored cards used in transactions with that merchant. Whereas, a breach at a system that stores a mix of tokens and cards would put all of the stored cards at risk.

In some embodiments, after discovering a first compromised token from a merchant 124, TM computing device 224 monitors for additional compromised tokens from that merchant 124. The existence of additional compromised tokens lowers the chance of a false positive. In other embodiments, the payment network 120 (shown in FIG. 1) may work with high-profile merchants 124 to plant dummy tokens. These tokens could be used as an early indicator that merchant 124 had been breached.

Figure 7:
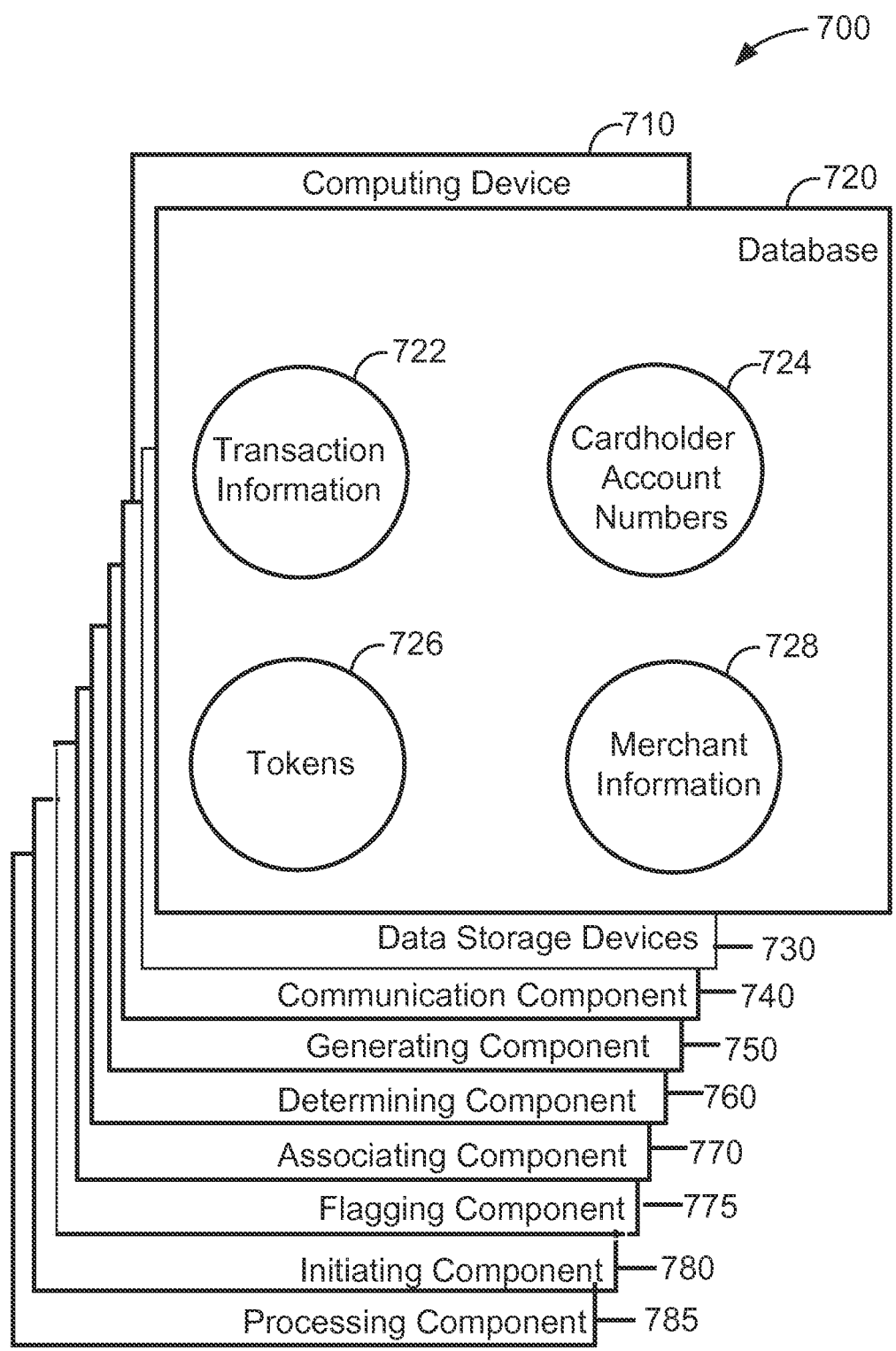

FIG. 7 is a diagram 700 of components of one or more example computing devices that may be used in the system 200 shown in FIG. 2. In some embodiments, computing device 710 is similar to server system 212; it may also be similar to TM computing device 224 (both shown in FIG. 2). Database 720 may be coupled with several separate components within computing device 710, which perform specific tasks. In this embodiment, database 720 includes transaction information 722, cardholders account numbers 724, tokens 726, and merchant information 728. In some embodiments, database 720 is similar to database 220 (shown in FIG. 2).

Computing device 710 includes the database 720, as well as data storage devices 730. Computing device 710 also includes a communication component 740 for receiving 505 a payment card account number, transmitting 525 a token (both shown in FIG. 5), receiving 605 authorization request messages, transmitting 630 authorization request messages, and transmitting 645 instructions, as shown in FIG. 6. Computing device 710 also includes a generating component 750 for generating 510 a token specific to a merchant, as shown in FIG. 5. A determining component 760 is also included for determining 610 whether a card identifier is a merchant specific token and determining 620 whether a token is associated with the same merchant as the transaction, both shown in FIG. 6. An associating component 770 is further included for associating 515 a token with a received payment card account number (as shown in FIG. 5). Moreover, a flagging component 775 is included for flagging 640 the merchant, all of the tokens associated with the merchant, and all of the payment card account numbers associated with the merchant, as shown in FIG. 6. In addition, an initiating component 780 is included for initiating 645 an investigation into the potentially compromised merchant, as shown in FIG. 6. A processing component 785 assists with execution of computer-executable instructions associated with the system.

The systems and processes are not limited to the specific embodiments described herein. In addition, components of each system and each process can be practiced independent and separate from other components and processes described herein. Each component and process also can be used in combination with other assembly packages and processes.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for detecting potentially compromised payment cards, said method implemented using a token monitoring computer device comprising a processor in communication with a memory including a database, wherein said token monitoring computer device is associated with an interchange network, said method comprising:

storing, in the database, a first merchant identifier associated with a first merchant and linking the first merchant identifier to a plurality of tokens, each token being linked to a payment card identifier, each token being generated based on one or more rules associated with the first merchant, and each token is formatted as a payment account number;

receiving, from a merchant computer device, an authorization request message associated with a transaction, wherein the authorization request message includes a transaction token and a transaction merchant identifier;

determining, by the processor, that the received transaction token is associated with the first merchant by comparing the transaction token to the plurality of tokens linked to the first merchant identifier;

determining, by the processor, that the transaction is not being generated by the first merchant by comparing the transaction merchant identifier to the first merchant identifier; and in response to the determination that the transaction is not being generated by the first merchant:

transmitting, by the processor to a computing device associated with an issuer bank associated with the transaction, a message including instructions to decline the transaction based on the determination that the merchant identifier does not correspond to the first merchant;

assigning, by the processor, a potentially compromised flag indicating a probability of fraudulent activity to the first merchant identifier based on the determination that the merchant identifier does not correspond to the first merchant;

assigning a first risk factor to one or more payment card accounts used in subsequent transactions involving the first merchant and occurring after the transaction; and assigning a second risk factor less than the first risk factor to one or more payment card accounts used in preceding transactions involving the first merchant and occurring before the transaction.

2. A method in accordance with claim 1, wherein if the determination is that the merchant identifier corresponds to the first merchant, the method further comprises:

determining, by the processor, a card identifier associated with the received transaction token; and transmitting, by the processor, the card identifier to be included in the authorization request message.

3. A method in accordance with claim 1 further comprising initiating an investigation into the first merchant based on the determination that the transaction is not being generated by the first merchant.

4. A method in accordance with claim 1 further comprising:

receiving, by the processor, a card identifier from the first merchant;

determining, by the processor, a token associated with the card identifier and the first merchant; and transmitting, by the processor, the token to the first merchant.

5. A method in accordance with claim 1 further comprising assigning, by the processor, the potentially compromised flag to a plurality of payment card accounts associated with a plurality of card identifiers, wherein the plurality of card identifiers are stored by the first merchant.

6. A method in accordance with claim 1 further comprising:

receiving, from the first merchant, a subsequent authorization request message including a card identifier;

determining, by the processor, that the potentially compromised flag is assigned to the first merchant identifier; and assigning, by the processor, the potentially compromised flag to the card identifier.

7. A method in accordance with claim 1 further comprising assigning, by the processor, the potentially compromised flag to one or more card identifiers used in transactions with the first merchant that occurred since the token was originally transmitted to the first merchant.

8. A method in accordance with claim 1 further comprising:

receiving, by the processor, a merchant cleared signal; and clearing, by the processor, the potentially compromised flag.

9. A method in accordance with claim 1 further comprising:

receiving, by the processor, a compromise confirmed signal; and updating, by the processor, one or more potentially compromised flags to confirmed compromised.

10. A token monitoring computing device for detecting potentially compromised payment cards, said computing device comprising one or more processors communicatively coupled to one or more memory devices including a database, said token monitoring computing device associated with an interchange network, said computing device configured to:

store, in the database, a first merchant identifier associated with a first merchant and linking the first merchant identifier to a plurality of tokens, each token is further linked to a payment card identifier, each token is generated based on one or more rules associated with the first merchant, and each token is formatted as a payment account number;

receive an authorization request message associated with a transaction from a merchant, wherein the authorization request message includes a transaction token and a transaction merchant identifier;

determine that the received transaction token is associated with the first merchant by comparing the transaction token to the plurality of tokens linked to the first merchant identifier;

determine that the transaction is not being generated by the first merchant by comparing the transaction merchant identifier to the first merchant identifier; and in response to the determination that the transaction is not being generated by the first merchant:

transmit, to a computing device associated with an issuer bank associated with the payment transaction, a message including instructions to decline the transaction based on the determination that the merchant identifier does not correspond to the first merchant;

assign a potentially compromised flag indicating a probability of fraudulent activity to the first merchant identifier based on the determination that the merchant identifier does not correspond to the first merchant;

assign a first risk factor to one or more payment card accounts used in subsequent transactions involving the first merchant and occurring after the transaction; and assign a second risk factor less than the first risk factor to one or more payment card accounts used in preceding transactions involving the first merchant and occurring before the transaction.

11. The token monitoring computing device in accordance with claim 10, wherein if the determination is that the merchant identifier corresponds to the first merchant, the token computing device is further configured to:

determine a card identifier associated with the received transaction token; and transmit the card identifier to be included in the authorization request message.

12. The token monitoring computing device in accordance with claim 10 further configured to initiate an investigation into the first merchant based on the determination that the transaction is not being generated by the first merchant.

13. The token monitoring computing device in accordance with claim 10 further configured to:
receive a card identifier from the first merchant;
determine a token associated with the card identifier and the first merchant; and
transmit the token to the first merchant.

14. The token monitoring computing device in accordance with claim 10 further configured to assign the potentially compromised flag to a plurality of payment card accounts associated with a plurality of card identifiers, wherein the plurality of card identifiers are stored by the merchant.

15. The token monitoring computing device in accordance with claim 10 further configured to:
receive, from the first merchant, a subsequent authorization request message including a card identifier;
determine that the potentially compromised flag is assigned to the first merchant identifier; and
assign the potentially compromised flag to the card identifier.

16. The token monitoring computing device in accordance with claim 10 further configured to assign the potentially compromised flag to one or more card identifiers used in transactions with the first merchant that occurred since the token was originally transmitted to the first merchant.

17. A computer-readable storage medium having computer-executable instructions embodied thereon, wherein when executed by a token monitoring computing device having at least one processor coupled to at least one memory device, the computer-executable instructions cause the at least one processor to:
store, in a database, a first merchant identifier associated with a first merchant and linking the first merchant identifier to a plurality of tokens, each token is linked to a payment card identifier, each token is generated based on one or more rules associated with the first merchant, and each token is formatted as a payment account number;
receive an authorization request message associated with a transaction from a merchant, wherein the authorization request message includes a transaction token and a transaction merchant identifier; and
determine that the received transaction token is associated with the first merchant by comparing the transaction token to the plurality of tokens linked to the first merchant identifier;
determine that the transaction is not being generated by the first merchant by comparing the transaction merchant identifier to the first merchant identifier; and
in response to the determination that the transaction is not being generated by the first merchant:
transmit, to a computing device associated with an issuer bank associated with the transaction, a message including instructions to decline the transaction based on the determination that the merchant identifier does not correspond to the first merchant;
assign a potentially compromised flag indicating a probability of fraudulent activity to the first merchant identifier based on the determination that the merchant identifier does not correspond to the first merchant, wherein the potentially compromised flag indicates a probability of fraudulent activity;
assign a first risk factor to one or more payment card accounts used in subsequent transactions involving the first merchant and occurring after the transaction; and
assign a second risk factor less than the first risk factor to one or more payment card accounts used in preceding transactions involving the first merchant and occurring before the transaction.

18. The computer-readable storage medium of claim 17, wherein the computer-executable instructions further cause the at least one processor to:
if the determination is that the merchant identifier corresponds to the first merchant, determine a card identifier associated with the received transaction token; and
transmit the card identifier to be included in the authorization request message.

19. The computer-readable storage medium of claim 17, wherein the computer-executable instructions further cause the at least one processor to initiate an investigation into the first merchant.

* * * * *